United States Patent
Swaine

(10) Patent No.: US 10,664,400 B2
(45) Date of Patent: May 26, 2020

(54) ADDRESS TRANSLATION CACHE PARTITIONING

(71) Applicant: ARM Limited, Cambridge (GB)

(72) Inventor: Andrew Brookfield Swaine, Sheffield (GB)

(73) Assignee: ARM Limited, Cambridge (GB)

(*) Notice: Subject to any disclaimer, the term of this patent is extended or adjusted under 35 U.S.C. 154(b) by 49 days.

(21) Appl. No.: 15/646,406

(22) Filed: Jul. 11, 2017

(65) Prior Publication Data
US 2019/0018777 A1  Jan. 17, 2019

(51) Int. Cl.
G06F 12/0846 (2016.01)
G06F 12/0808 (2016.01)
G06F 12/1009 (2016.01)
G06F 12/1036 (2016.01)

(52) U.S. Cl.
CPC ...... *G06F 12/0848* (2013.01); *G06F 12/0808* (2013.01); *G06F 12/1009* (2013.01); *G06F 12/1036* (2013.01); *G06F 2212/282* (2013.01); *G06F 2212/684* (2013.01)

(58) Field of Classification Search
CPC .......................... G06F 12/1027–1063
See application file for complete search history.

(56) References Cited

U.S. PATENT DOCUMENTS

| 4,376,297 | A | * | 3/1983 | Anderson | G06F 12/1036 711/207 |
| 5,404,476 | A | * | 4/1995 | Kadaira | G06F 12/1036 711/207 |
| 5,790,979 | A | * | 8/1998 | Liedtke | G06F 12/1009 711/206 |
| 5,796,978 | A | | 8/1998 | Yoshioka | |
| 5,924,127 | A | * | 7/1999 | Kawamoto | G06F 12/1036 711/207 |

(Continued)

FOREIGN PATENT DOCUMENTS

| FR | 3 019 921 | 10/2015 |
| GB | 2 421 821 | 7/2006 |

(Continued)

OTHER PUBLICATIONS

Groesbrink et al. "Modular Paging with Dynamic TLB Partitioning for Embedded Real-Time Systems." Jun. 2008. IEEE. SIES 2008. pp. 261-264.*

(Continued)

*Primary Examiner* — Nathan Sadler
(74) *Attorney, Agent, or Firm* — Nixon & Vanderhye P.C.

(57) ABSTRACT

An apparatus has an address translation cache with entries for storing address translation data. Partition configuration storage circuitry stores multiple sets of programmable configuration data each corresponding to a partition identifier identifying a corresponding software execution environment or master device and specifying a corresponding subset of entries of the cache. In response to a translation lookup request specifying a target address and a requesting partition identifier, control circuitry triggers a lookup operation to identify whether the target address hits or misses in the corresponding subset of entries specified by the set of partition configuration data for the requesting partition identifier.

17 Claims, 6 Drawing Sheets

(56) References Cited

U.S. PATENT DOCUMENTS

| | | |
|---|---|---|
| 6,629,220 B1 | 9/2003 | Dyer |
| 7,069,413 B1* | 6/2006 | Agesen ............... G06F 12/1036 711/207 |
| 9,172,655 B1 | 10/2015 | Dropps |
| 2005/0055510 A1 | 3/2005 | Hass et al. |
| 2006/0136639 A1 | 6/2006 | Futral |
| 2009/0282405 A1 | 11/2009 | Moir et al. |
| 2009/0327646 A1 | 12/2009 | Jordan et al. |
| 2010/0058026 A1* | 3/2010 | Heil .................... G06F 12/1027 711/207 |
| 2010/0306499 A1 | 12/2010 | Petolino, Jr. |
| 2011/0145512 A1 | 6/2011 | Adl-Tabatabai et al. |
| 2013/0013889 A1 | 1/2013 | Devaraj et al. |
| 2013/0076768 A1 | 3/2013 | Chakraborty et al. |
| 2013/0179892 A1 | 7/2013 | Frazier |
| 2014/0101306 A1 | 4/2014 | Murgia |
| 2014/0101340 A1 | 4/2014 | Jandhyam |
| 2014/0123146 A1* | 5/2014 | Barrow-Williams ....................... G06F 9/5033 718/102 |
| 2014/0181821 A1 | 6/2014 | Shavit et al. |
| 2014/0195743 A1 | 7/2014 | Fleischer |
| 2015/0039763 A1 | 2/2015 | Chaudhary |
| 2015/0089153 A1 | 3/2015 | Busaba et al. |
| 2015/0089185 A1 | 3/2015 | Brandyberry |
| 2015/0213153 A1* | 7/2015 | Shah ................ G06F 16/90339 711/108 |
| 2015/0242214 A1 | 8/2015 | Busaba et al. |
| 2015/0242218 A1 | 8/2015 | Shum et al. |
| 2015/0242248 A1 | 8/2015 | Busaba et al. |
| 2015/0301951 A1 | 10/2015 | Bybell |
| 2015/0301953 A1 | 10/2015 | Bybell |
| 2015/0347138 A1 | 12/2015 | Gschwind et al. |
| 2017/0010968 A1 | 1/2017 | Li |
| 2018/0157601 A1 | 6/2018 | Bryant |

FOREIGN PATENT DOCUMENTS

| | | |
|---|---|---|
| GB | 2 539 429 | 12/2016 |
| GB | 2 539 433 | 12/2016 |
| GB | 2 539 435 | 12/2016 |
| GB | 2 539 436 | 12/2016 |
| WO | 2005/036405 | 4/2005 |
| WO | 2014/122415 | 8/2014 |
| WO | 2016/196855 | 12/2016 |

OTHER PUBLICATIONS

Channon et al. "Performance Analysis of Re-configurable Partitioned TLBs." 1997. IEEE. HICSS 1997. pp. 168-177. (Year: 1997).*

Culler et al. Parallel Computer Architecture: A Hardware/Software Approach. 1997. Morgan Kaufmann. pp. 407-408.*

Jacob et al. Memory Systems: Cache, DRAM, Disk. 2008. Morgan Kaufmann. pp. 910-920.*

Office Action dated May 4, 2018 in co-pending U.S. Appl. No. 15/405,661, 22 pages.

U.S. Appl. No. 15/405,661, filed Jan. 13, 2017; Inventor: Krueger.
U.S. Appl. No. 15/405,691, filed Jan. 13, 2017; Inventor: Krueger.
U.S. Appl. No. 15/405,563, filed Jan. 13, 2017; Inventor: Krueger.
U.S. Appl. No. 15/405,572, filed Jan. 13, 2017; Inventor: Krueger.
U.S. Appl. No. 15/405,625, filed Jan. 13, 2017; Inventor: Krueger.

Intel Corporation, "Improving Real-Time Performance by Utilizing Cache Allocation Technology—Enhancing Performance via Allocation of the Processor's Cache" White Paper, Apr. 2015, pp. 1-16.

N. Khang (Intel), "Benefits of Intel® Cache Monitoring Technology in the Intel® Processor E5 v3 Family" https://software.intel.com/en-us/blogs/2014/06/18/benefit-of-cache-monitoring, Sep. 8, 2014, 2 pages.

N. Khang (Intel), "Introduction to Cache Allocation Technology in the Intel® Xeon® Processor E5 v4 Family" https://software.intel.com/en-us/articles/introduction-to-cache-allocation-technology, Feb. 11, 2016, 4 pages.

N. Khang (Intel), "Introduction to Memory Bandwidth Monitoring in the Intel® Xeon® Processor E5 v4 Family" https://software.intel.com/en-us/articles/introduction-to-memory-bandwith-monitoring, Feb. 11, 2016, 3 pages.

International Search Report and Written Opinion of the International Searching Authority dated Mar. 13, 2018 in PCT/GB2017/053661, 18 pages.

C. Jacobi et al, "Transactional Memory Architecture and Implementation for IBM System z" *2012 IEEE/ACM 45th Annual International Symposium on Microarchitecture*, Dec. 1, 2012, pp. 25-36.

W. Zhao et al, "Dynamic Memory Balancing for Virtual Machines" *VEE'09 Proceedings of the 2009 ACM SIGPLAN/SIGOPS International Conference on Virtual Execution Environments*, Mar. 11-13, 2009, pp. 21-.

International Search Report and Written Opinion of the International Searching Authority dated Mar. 21, 2018 in PCT/GB2017/053662, 15 pages.

Partial International Search Report and Invitation to Pay Additional Fees dated Feb. 26, 2018 in PCT/GB2017/053663, 13 pages.

International Search Report and Written Opinion of the International Searching Authority dated Mar. 21, 2018 in PCT/GB2017/053664, 15 pages.

International Search Report and Written Opinion of the International Searching Authority dated Mar. 21, 2018 in PCT/GB2017/053680, 14 pages.

Office Action dated May 17, 2018 in co-pending U.S. Appl. No. 15/405,691, 25 pages.

Final Office Action dated Dec. 14, 2018 in co-pending U.S. Appl. No. 15/405,661, 24 pages.

Office Action dated Feb. 21, 2019 in co-pending U.S. Appl. No. 15/405,572, 26 pages.

Office Action dated Mar. 7, 2019 in co-pending U.S. Appl. No. 15/405,625, 30 pages.

Office Action dated Jun. 13, 2019 in co-pending U.S. Appl. No. 15/405,563, 20 pages.

* cited by examiner

ADDRESS TRANSLATION CACHE PARTITIONING

BACKGROUND

Technical Field

The present technique relates to the field of data processing. More particularly, it relates to an address translation cache.

Technical Background

An apparatus may have an address translation cache for storing address translation data for corresponding blocks of addresses. When processing circuitry needs to access data from a target address, a lookup can be made in the address translation cache to identify address translation data corresponding to a block of addresses including the target address, and the address translation data can be used for translation of the target address into a translated address. For example the target address may be a virtual address used by instructions to refer to areas of memory while the translated address may be a physical address used by the memory system. The address translation data in the address translation cache could specify the address mapping providing the correspondence between the target address and the translated address, or could specify an address of a next level translation entry in a multi-level address translation process.

SUMMARY

At least some examples provide an apparatus comprising:
an address translation cache comprising a plurality of entries, each entry to store address translation data for a corresponding block of addresses;
partition configuration storage circuitry to store a plurality of sets of programmable partition configuration data, each set of programmable partition configuration data corresponding to a partition identifier identifying a corresponding software execution environment or master device and specifying a corresponding subset of entries of the address translation cache; and
control circuitry responsive to a translation lookup request specifying a target address and a requesting partition identifier identifying the software execution environment or master device associated with the translation lookup request, to perform a lookup operation to identify whether the target address hits or misses in the corresponding subset of entries specified by the set of programmable partition configuration data corresponding to the requesting partition identifier.

At least some examples provide an apparatus comprising:
means for caching address translation data, comprising a plurality of entries, each entry to store address translation data for a corresponding block of addresses;
means for storing a plurality of sets of programmable partition configuration data, each set of programmable partition configuration data corresponding to a partition identifier identifying a corresponding software execution environment or master device and specifying a corresponding subset of entries of the means for caching; and
means for performing, in response to a translation lookup request specifying a target address and a requesting partition identifier identifying the software execution environment or master device associated with the translation lookup request, a lookup operation to identify whether the target address hits or misses in the corresponding subset of entries specified by the set of programmable partition configuration data corresponding to the requesting partition identifier.

At least some examples provide a method for accessing address translation data from an address translation cache comprising a plurality of entries, each entry to store address translation data for a corresponding block of addresses, the method comprising:
in response to a translation lookup request specifying a target address and a requesting partition identifier identifying a software execution environment or master device associated with the translation lookup request:
accessing partition configuration storage circuitry storing a plurality of sets of programmable partition configuration data, each set of programmable partition configuration data corresponding to a partition identifier identifying a corresponding software execution environment or master device and specifying a corresponding subset of entries of the address translation cache; and
performing a lookup operation to identify whether the target address hits or misses in the corresponding subset of entries specified by the set of programmable partition configuration data corresponding to the requesting partition identifier.

Further aspects, features and advantages of the present technique will be apparent from the following description of examples, which is to be read in conjunction with the accompanying drawings.

DESCRIPTION OF EXAMPLES

Figure 1:
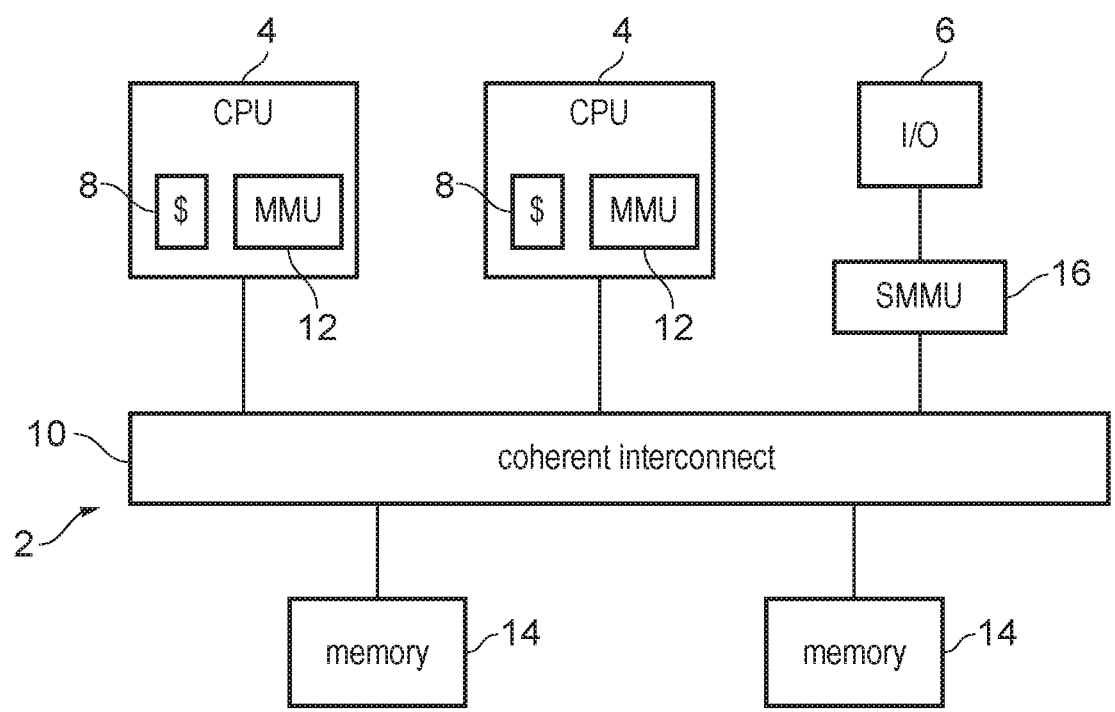
FIG. 1 schematically illustrates an example of a data processing apparatus including an address translation cache.

It can be desirable to prevent one software execution environment or master device using more than its fair share of resource, to prevent other execution environments or master devices perceiving a loss of performance. This can be particularly important for data centre (server) applications where there is an increasing demand to reduce capital expenditure by increasing the number of independent software processes which interact with a given amount of memory capacity, to increase utilisation of the data centre servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single system-on-chip (SoC) which previously would have been on separate SoCs. This again leads to a desire to limit performance interactions between software execution environments or masters.

An address translation cache may be shared between multiple master devices or software execution environments which may be seeking to cache address translation data for different blocks of addresses in the address translation cache. Interference between different masters or software execution environment accessing the same address translation cache can cause repeated replacement of an entry allocated by one software execution environment or master device with an entry allocated by another software execution environmental master device. This can lead to loss of performance for both interfering masters or software execution environments.

These issues can be addressed by partitioning the address translation cache into programmable partitions which can be allocated to particular partition identifiers representing a corresponding software execution environment or master device. Hence, partition configuration storage circuitry is provided to store a number of sets of programmable partition configuration data, with each set of programmable partition configuration data corresponding to a partition identifier of a corresponding software execution environment or master device and specifying a corresponding subset of entries of the address translation cache. In response to a translation lookup request which specifies a target address and a requesting partition identifier identifying the software execution environment or master device associated with the translation lookup request, control circuitry performs a lookup operation to identify whether the target address hits or misses in the corresponding subset of entries that is specified by the set of programmable partition configuration data corresponding to the requesting partition identifier.

Hence, by programming different software execution environment or master devices to correspond to different subsets of entries as specified by the partition configuration data, each software execution environment or master device can effectively have a portion of the address translation cache capacity reserved for its own use so that even if another software execution environment or master device has a large working set of addresses and tries to allocate many address translation entries into the cache, the first software execution environment or master device still has a region of the cache capacity available for its own address translation data, so it is not effected by the higher load placed on the cache by the other software execution environment or master device.

This approach may provide a hard partitioning of the address translation cache storage capacity so that lookups in the cache focus on particular regions allocated to the relevant software execution environment or master device. Unlike for a data cache where different processes may share access to the same data and so it is often desirable to be able to share the same physical entries in the cache, with an address translation cache each software execution environment may typically have a different translation context so that it is unlikely that different processes would share the same address translation data. Hence, while for a data cache it may be beneficial to allow each software execution environmental master device to look up the entire cache capacity for data even if the data has been allocated by another software execution environment or master device, with the approach described above for the address translation cache, each software execution environment or master device may look up the entries of its own partition (subset of entries) but need not look up the subsets of entries allocated to other software execution environment or master devices. This can make the lookup process more efficient, as fewer entries need to be looked up. Having specific subsets of entries of the cache allocated to particular software execution environments or masters can also simplify invalidations.

The software execution environment associated with a given partition identifier could be any software process executed by processing circuitry within the apparatus or by a given master device. For example, a software execution environment may be an application, operating system, virtual machine, hypervisor, or any other separately identified portion of program code executed by a given processor or master device within the apparatus. In some cases, different parts of the same software process (e.g. application or operating system) may be allocated different partition identifiers. It is also possible to allocate the same partition identifier to multiple different processes if it is desired for them to share a subset of entries of the cache. This can be useful if the average working set of addresses is expected to be small but occasionally there is demand for a larger working set, so that sharing a subset between multiple different processes provides sufficient entries for handling the peak demand without unnecessarily reserving that number of entries for each of the different processes which may not often need that number of entries. Also, in some cases a given master device may be allocated at a particular partition identifier regardless of which software is being executed by the master. Alternatively a given master may support execution of a number of different software execution environments allocated separate partition identifiers. Hence, there is flexibility in the way the partition identifiers are mapped to particular software execution environments or master devices. For conciseness, the software execution environment or master device associated with a particular partition identifier will be referred to as a requester below. It will be appreciated that the requester could be either a software process or a hardware device.

The allocation of partition identifiers to particular requesters can be controlled by software running on a particular device. The software controlling partition identifier allocation could itself be one of the requesters having its own partition identifier allocated to it. For example, an operating system or hypervisor may set the partition identifiers to be used by itself and by other software processes running beneath it. It is not essential for every software execution environment being executed to be allocated its own special partition identifier. In some cases some software execution environments for which no specific partition identifier has been allocated may be considered to map to a certain default partition identifier. To support tagging of translation lookup requests with the partition identifier of the relevant requester, the master device or processor providing the request may have a register for storing the partition identifier of the current process or of that particular hardware device, which can be appended to translation lookup requests sent to the address translation cache. The partition identifier in the partition identifier register could be treated as part of the context of a given software execution environment, so that when there is a context switch then the partition identifier for the new software execution environment is loaded into the register and the partition identifier of the previously executing process may be saved to memory along with its other context data.

In response to the translation lookup request, the control circuitry may exclusively look up the corresponding subset of entries associated with the requesting partition identifier, so cannot hit against entries outside the corresponding set. Hence, entries other than the corresponding subset of entries for the requesting partition identifier may be excluded from the lookup operation.

When the target address misses in the corresponding subset of entries for the requesting partition identifier, then translation data may be allocated to one of the corresponding subset of entries indicated by the set of programmable partition configuration data corresponding to the requesting partition identifier. Hence, a given requester is restricted to allocating translation data to its particular subset of entries as specified in the configuration data, and cannot allocate data to other subsets of entries allocated to other partition identifiers. This helps to reduce the amount of interference between different processes.

In response to an invalidation request requesting invalidation of address translation data associated with at least one address, the control circuitry may perform an invalidation lookup operation on subsets of entries specified by at least two of the sets of programmable partition configuration data. For example, the invalidation lookup may lookup each of the subsets of entries specified by the different sets of programmable partition configuration data in turn. For example, if there is a change to the page tables in memory then this may affect the translation data used by more than one requester and so it may be required to invalidate any translation data associated with a given address, not just the translation data associated with a particular partition identifier. Although in some cases the invalidation may act on each of the subsets of entries specified by each set of programmable partition configuration data, this is not essential and in some cases it may not be necessary to consider the subsets of entries specified by all of the sets of partition configuration data during the invalidation (e.g. if multiple partition identifiers share the same subset of entries as discussed below).

The partition configuration data is programmable and so can be updated in response to a configuration request issued by a certain device or software execution environment. In some cases programming of the partition configuration data may be restricted to processes executing at a certain privilege level or exception level. For example, the programmable partition configuration data may be allowed to be reprogrammed only by a hypervisor or operating system. In response to a configuration request requesting reprogramming of a given set of a programmable configuration data, the control circuitry may trigger invalidation of the corresponding subset of entries specified by the given set of programmable partition configuration data. This invalidation may be of the subset of entries specified by the given set of programmable partition configuration data before the reprogramming takes place, or the subset of entries specified by the given set of programmable partition configuration data after the reprogramming, or both. By invalidating entries upon reprogramming of the partition configuration data, this prevents one requester learning information on which addresses have been accessed by a different requester which previously used the same subset of entries in the address translation cache, which could be undesirable for security reasons for example.

While it may be possible to specify arbitrarily sized subsets of entries for each partition identifier, in one example each subset of examples has a size corresponding to a power of two. This can simplify indexing of the address translation cache since it means that the subset of entries for a given partition identifier can be selected based on a whole number of bits of the target address. Depending on the size of the subset of entries, different numbers of bits of the target address may be used to derive the index and tags for accessing the cache.

Each set of programmable partition configuration data may specify information which is indicative of a start entry and an end entry of the corresponding subset of entries. The storage hardware, e.g. random access memory (RAM) unit, providing the address translation cache storage may have its own addressing scheme for identifying particular entries of the cache in response to a cache memory address. This cache memory address space is different from the address space to be translated in response to translation lookup requests (the address space being translated is used for accessing a separate memory system, while the cache memory address space refers to the specific RAM providing the storage of the address translation data). Hence, each set of programmable partition configuration data may specify at least one cache memory address identifying the start entry or end entry of the corresponding subset. For example, different options for defining the start and end entries can include:
 A base cache memory address identifying the start entry and a size parameter identifying the total number of entries of the subset of entries, hence implicitly identifying the end entry;
 A start cache memory address identifying the start entry and an end cache memory address explicitly identifying the end entry;
 A base address identifying the start entry, which may implicitly also identify the end entry in an embodiment where each partition is assumed to be implicitly of a certain fixed size so that it is not necessary to specify any explicit information setting the end entry or the size of the partition.

Some embodiments may support overlapping partitions so that the subset of entries for one partition identifier may be defined entirely within the subset defined for another partition identifier, or may partially overlap. However, the implementation may be more efficient if the subsets of entries defined by the respective partition identifiers are prohibited from overlapping so that a number of distinct regions are defined by the partition configuration data. For example, enforcing non-overlapping regions can simplify tagging of cache entries.

It is also possible for the partition configuration storage circuitry to support sets of programmable partition data specifying the same subset of entries for two or more partition identifiers. Sharing of the same subset of entries between two or more different partition identifiers may be useful for example if two or more requesters are considered unlikely to interfere significantly but may each require a greater number of entries to be made available to handle peak load of translation requests when necessary.

In cases where multiple partitions share the same subset of entries, then if invalidations are handled as discussed above where an invalidation request triggers the control circuitry to step through each set of programmable partition configuration data invalidating entries associated with the specified target address(es) from the corresponding subset of entries, this may lead to unnecessary invalidation lookups performed on the same subset of entries more than once, because of the duplication in specifying the same subset of entries in different sets of programmable partition configuration data. To make invalidations more efficient, each set of programmable partition data may include at least one duplicate flag which indicates whether a subset of entries specified by that set of the programmable partition configuration data is the same as a subset specified by another set of programmable partition configuration data. Hence, on setting two or more sets of programmable partition configuration data to specify the same subset of entries, all but one of the duplicated sets of programmable partition configuration data can be set with the duplicate flag indicating that the data is a duplicate, so that on invalidations the invalidation lookup operation can be performed for one of the sets of partition configuration data, but omitted for another set of partition configuration data where the duplicate flag is set.

In some cases each entry of the address translation cache may store address translation data corresponding to one of two or more page table levels. For example, page tables in memory which define the address mappings for different blocks of addresses can typically be represented more efficiently in the memory capacity by splitting them into multiple page table levels. Locating the address mapping for a given block of addresses may require a first page table level to be selected based on a subset of bits of the address, with the accessed page table entry then identifying an address of the next level page table where a further indexing is performed using another subset of address bits. This may be repeated multiple times to walk through each level of page table until the final address mapping is located in the final level page table. Since often address mappings may not be defined across the entire address space, this approach allows the address mappings for the regions of the address space which have been defined to be coalesced into a smaller region of memory, as they can then be accessed based on the higher level page tables rather than needing to be indexed directly based on the target address. It can be useful to cache higher level page table entries in the address translation cache as well as the final level entries, to speed up page table walks. The address translation cache may be shared between the different page table levels so that it can cache entries from any of the page table levels. For a final level page table the address translation data may specify the actual address mapping to be used for translating a corresponding block of addresses. For higher level page tables, the address translation data may specify an address of a next level page table.

Each set of programmable partition configuration data may specify a corresponding subset of entries of the address translation cache separately for at least two of the plurality of page table levels. In some cases, a set of partition configuration data may define separate subsets of entries for each of the page table levels. This means that entries of the address translation cache can be reserved for caching address translation data from a particular page table level for a particular software execution environment or master device that is to access that address translation data. Hence, a received translation lookup request may identify a specified page table level associated with the request as well as the target address and the requesting partition identifier. In response, the control circuitry for the address translation cache may lookup the corresponding subset of entries specified for the specified page table level by the set of programmable partition configuration data corresponding to the partition identifier, to identify whether there is a hit or a miss for the target address.

In cases with multiple levels of page tables, it is possible that interference between different requesters may be more likely for the final level or levels of the page table than for higher levels. This is because the higher levels typically correspond to a larger block of addresses than lower levels, so fewer entries are required to cover a requester's working set of addresses, and also the higher level page table entries are less likely to be evicted and replaced as frequently. Hence, in one example use case it may be desired for different partition identifiers to share the same subset of entries for some levels of the page table structure (e.g. the higher levels) but have different subsets of entries defined for other levels (e.g. the final level providing the actual address translating mapping).

Therefore, the technique discussed above of defining the same subset of entries for different partition identifiers can be particularly useful in the context of multiple page table levels being cached within the same address translation cache. The duplicate flag discussed above may be used to indicate whether the subset of entries defined for a particular page table level for a given partition identifier is the same as the subset of entries specified for another partition identifier. Hence, in some cases each subset of entries specified for different page table levels in a given set of programmable partition configuration data may have a corresponding duplicate flag which indicates whether that subset is the same as another subset specified by a different set of programmable partition data. Invalidation lookups can then be omitted for the subset of entries specified for a given page table level where the duplicate flag indicates that this is a duplicate of another subset specified elsewhere within the programmable partition configuration data storage.

Similarly, some systems may support multiple stages of address translation, where each entry may store one of stage one address translation data for translating first addresses into second addresses and stage two address translation for translating second addresses into third addresses. For example, this can be useful for supporting virtualisation where for example the stage one address translation data may translate a virtual address specified by program instructions executed by applications into intermediate physical addresses (which the operating system may allocate assuming they represent the actual memory locations accessed). The stage two address translation data may then translate the intermediate physical addresses into physical addresses which are used for the actual memory accesses. This can enable the hypervisor controlling virtualisation to configure the stage two address translation data to map conflicting intermediate physical addresses generated by respective guest operating systems onto separate regions of physical memory.

In systems supporting multiple stages of address translation data, each set of programmable partition configuration data may specify a corresponding subset of entries separately for the stage one address translation data and the stage two address translation data. Regions of the address translation cache can therefore be reserved for address translation data associated with a particular stage of address translation for a particular requester, to reduce performance bottlenecks caused by interference between different processes. Again, it is possible for the same subset of entries to be specified for different requesters for stage 1 and/or stage 2. For example, while an operating system and all the applications running under that operating system may have different stage one address translation mappings and so may specify different subset of entries for the stage one address translation data, the stage two address translation may be common for each of those processes and so it may be useful for the requesters represented by a number of different partition identifiers to share the same subset of entries of the address translation cache for storing stage two address translation data.

In some cases, where M stages of address translation are provided and each stage of address translation includes N levels of page tables, the total number subsets of entries specified by each set of programmable partition configuration data may be M×N.

Some systems may comprise processing circuitry which may operate in one of a first domain and a second domain, where in the first domain the processing circuitry has access to at least some data which is inaccessible in the second domain. For example the first domain may be a secure domain and hardware mechanisms may be provided to protect sensitive data associated with the first (secure) domain from access by code executing in the second (non-secure) domain. For example, access protection may be controlled using a memory management unit. In such a system, at least one partition identifier may be reserved for a software execution environment executed by the processing circuitry in the first domain. For example, this restriction can be enforced by the process which allocates partition identifiers to particular requesters. Alternatively the partition identifier used to select the required set of programmable partition configuration data could be selected not only based on the partition identifier allocated to the requester but also based on a security status bit specifying whether the request was made from the first domain or the second domain. Hence, effectively the partition identifier used to access the partition configuration data storage may be one bit longer than the partition identifier provided by the requester, and identical values of the partition identifier may map to different actual partition identifiers depending on which domain the request was made from. By reserving a certain partition identifier for processes executed in the first domain, this can improve security because it can prevent a process executing in the second domain identifying information about processes running in the first domain based on what addresses have had address translation data allocated to the address translation cache, which could pose a security vulnerability. In systems supporting a first domain and a second domain, it may be ensured that it is not possible for a secure partition identifier and a less secure partition identifier to specify the same subset of entries of the address translation cache. For example, this can be controlled by checking the new data to be programmed into the partition configuration storage each time a reprogramming request is made, to determine that the subset of entries to be programmed for a non-secure partition identifier does not overlap with a subset of entries set for a secure partition identifier.

Another approach for maintaining security can be for the secure processes in the first domain to use an entirely separate address translation cache to the address translation cache used by the processes in the second domain. In this case, the partitioning could be applied to one or both of the secure and non-secure address translation caches.

Another approach for preventing interaction between the processes in the first domain and the second domain may be for the address translation cache to be shared, but a capacity of the address translation cache visible to a software environment executed by the processing circuitry in the first domain to be greater than a capacity of the address translation cache visible to a software execution environment executed in the second domain. For example, the software in the first and second domains may have different views of a cache limit address specifying the maximum cache memory address which can be accessed, so that effectively the first domain has a portion of the address translation cache which can be reserved for its own private use and cannot be accessed by the second domain, improving security.

FIG. 1 schematically illustrates an example of a data processing apparatus 2 including one or more address translation caches. The apparatus 2 includes a number of master devices 4, 6 which in this example include two central processing units (CPUs) 4 and an input/output unit 6 for controlling input or output of data from/to a peripheral device. It will be appreciated that many other types of master devices could also be provided, such as graphics processing units (CPUs), a display controller for controlling display of data on a monitor, direct memory access controllers for controlling access to memory, etc. At least some of the master devices may have internal data or instruction caches 8 for caching instructions or data local to the device. Other masters such as the input/output interface 6 may be uncached masters. Coherency between data in the respective caches and accessed by the respective masters may be managed by a coherent interconnect 10 which tracks requests for accesses to data from a given address and controls snooping of data in other masters' caches when required for maintaining coherency. It will be appreciated that in other embodiments such coherency operations could be managed in software, but a benefit of providing a hardware interconnect 10 for tracking such coherency is that the programmers of the software executed by the system do not need to consider coherency.

As shown in FIG. 1, some masters may include a memory management unit (MMU) 12 which may include at least one address translation cache for caching address translation data used for translating addresses specified by the software into physical addresses referring to specific locations in memory 14. It is also possible to provide a system memory management unit (SMMU) 16 which is not provided within a given master device, but is provided as an additional component between a particular master 6 and the coherent interconnect 10, for allowing simpler master devices which are not designed with a built-in MMU to use address translation functionality. In other examples the SMMU 16 could be considered part of the interconnect 10.

Figure 2:
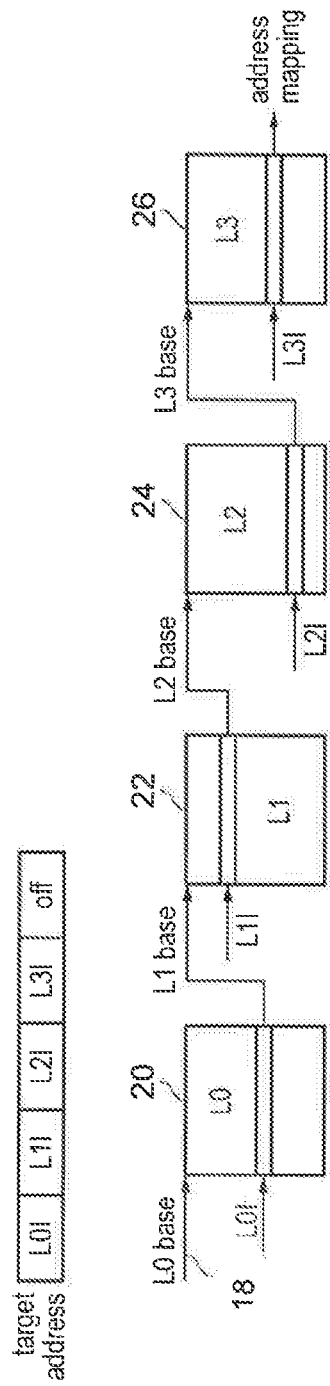
FIG. 2 shows an example of a multi-level page table walk operation to locate an address mapping for a given address.

Page tables may be defined within the memory 14 for storing the address translation mappings for blocks of addresses across a given address space. As shown in FIG. 2, the page tables may be implemented in multiple levels of page tables, which may be traversed in a page table walk operation to identify the address mapping for a particular target address. As shown in FIG. 2, a given set of index bits L0I may be used to index into a level zero page table 20 whose location in memory is identified by a level zero (L0) base address 18. The L0 base address 18 may be stored in a register of the (S)MMU 12, 16 for example. The indexed entry of the L0 table 20 identifies as an L1 base address identifying the location in memory of an L1 page table 22. A different subset of index bits L1I from the target address selects one of the entries of the L1 page table 22, which then identifies an L2 base address identifying the memory location of a L2 page table 24. Another subset of index bits L2I from the target address indexes into the L2 page table 24, to identify an L3 base address which identifies the location of an L3 page table 26. Yet another subset of bits L3I of the target address then selects a particular entry of the L3 page table 26 which provides the actual address mapping for mapping the target address into a translated address such as a physical address. Hence, the L3 page table 26 is the final page table which provides the actual address mapping information and the higher level page tables 20, 22, 24 provide intermediate entries which identify the base address of a next level page table. It will be appreciated that providing four levels of page table is just one example and others could use different numbers of page tables. By splitting page tables into different levels in this way, the total amount of memory storage required for storing the entire page table structure can be reduced because it is not necessary to locate the address mappings for translating a given amount of address space in a region or memory having the equivalent size to the address size being mapped, exploiting the fact that often large chunks of the address space do not have any mappings defined yet by the operating system or other process setting the address translation data. While FIG. 2 shows an example where the index bits L0I, L1I etc. are used directly as the index for selecting a corresponding page table entry, the index could also be the result of a hash function applied to the index bits.

In some systems, an (S)MMU 12, 16 may have entirely separate address translation caches for translating entries from different levels of the page table. Typically, the cache which caches entries from the final level page table 26 may be referred to as a translation lookaside buffer, while caches which cache higher level page table entries from page tables 20, 22, 24 may be referred to as walk caches. On the other hand, other embodiments may provide a shared address translation cache which can cache address translation data from multiple levels of the page table. Either approach can be used in the present technique. While one cache is described below, some (S)MMUs may include multiple levels of address translation cache in a cache hierarchy, to trade off access latency against capacity (e.g. a smaller numbers of entries stored in a level 0 address translation cache for fast access, and a larger number of entries stored in a level 1 address translation cache for slower access in the event of a miss in the level 0 address translation cache).

Figure 3:
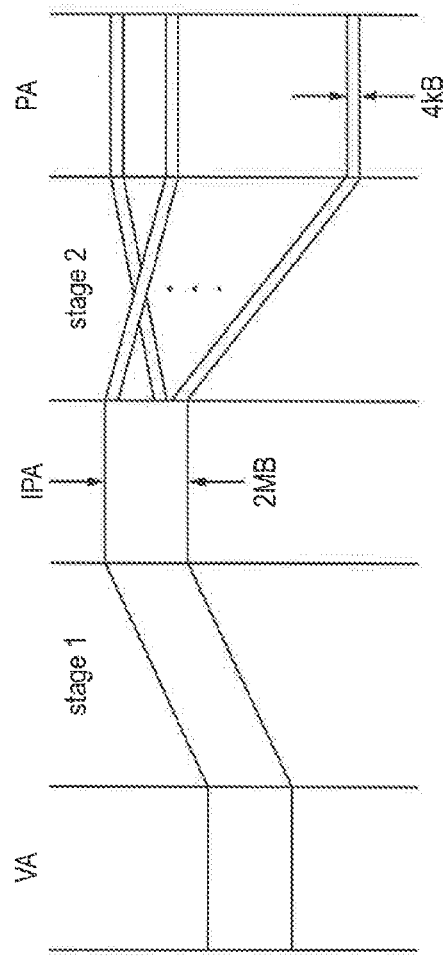
FIG. 3 shows an example of a two-stage address translation process.

As shown in FIG. 3, the address translation process may also involve multiple stages of address translation between different address spaces. For example, virtual addresses (first addresses) used to identify memory locations by the instructions executed by an application or operating system running on a CPU 4 may be translated into intermediate physical addresses (second addresses) in a stage 1 translation. The configuration data for controlling the stage 1 address may be set by the operating system for example. From the operating system's point of view the intermediate physical addresses generated in the stage 1 address translation may be assumed to be the physical addresses of the actual memory addresses being accessed. However, to support virtualisation and prevent identical intermediate physical addresses used by different operating systems coexisting on the same device from conflicting, a hypervisor may then provide a further second stage address translation between the intermediate physical addresses (second addresses) and physical addresses (third addresses) actually referring to the memory locations to be read or written in memory 14. Hence there may be a second set of page tables defined by the hypervisor corresponding to the stage 2 address translation.

Note that each of the two stages of address translation may use multiple levels of page tables as shown in FIG. 2. Hence, a full page table walk to identify an address mapping for a given block of addresses identified by a target virtual address may require each of the base addresses for the page tables used in the stage 1 address translation to go through the stage 2 address translation before accessing the corresponding level of the stage 1 page table. That is, the full page table walk process may include accessing the multiple levels of page tables in the following sequence:

Stage 2 translation of the base address of the stage 1 level 0 page table into a physical address (the stage 1 level 0 base address is typically an intermediate physical address because the stage 1 translations are configured by the operating system). The stage 2 translation comprises 4 lookups (stage 2, level 0; stage 2, level 1; stage 2, level 2; stage 2, level 3).

Stage 1 level 0 lookup based on the level 0 index portion L0I of the target virtual address to identify the stage 1 level 1 base address (an intermediate physical address)

Stage 2 translation of the stage 1 level 1 base address into a physical address (again, comprising 4 lookups).

Stage 1 level 1 lookup based on the level 1 index portion L1I of the target virtual address to identify the stage 1 level 2 base address (an intermediate physical address)

Stage 2 translation of the stage 1 level 2 base address into a physical address (again comprising 4 lookups)

Stage 1 level 2 lookup based on the level 2 index portion L2I of the target virtual address to identify the stage 1 level 3 base address (an intermediate physical address)

Stage 2 translation of the stage 1 level 3 base address into a physical address (again comprising 4 lookups).

Stage 1 level 3 lookup based on the level 3 index portion L3I of the target virtual address to identify the target intermediate physical address corresponding to the target virtual address Stage 2 translation of the target intermediate physical address into the target physical address which represents the location in memory to access corresponding to the original target virtual address (again, comprising 4 lookups).

Hence, without any caching, the translation would comprise 24 lookups in total. As can be seen from the above sequence, performing the entire page table walk process can be very slow as it may require a large number of accesses to memory to step through each of the levels of page tables for each of the stages of address translation. This is why it is often desirable to cache not only the final level address mapping but also entries from higher level page tables of the stage 1 and the stage 2 tables within the (S)MMU 12, 16. This can allow at least some steps of the full page table walk to be bypassed even if the final level address mapping for a given target address is not currently in the address translation cache. As shown in FIG. 3, it is possible for the stage 1 and stage 2 address translations to provide page table entries which map to different sizes of blocks of addresses. For example the stage 1 address translation may operate with a block size of 2 MB and the stage 2 address translation may operate with a block size of 4 kB.

Figure 4:
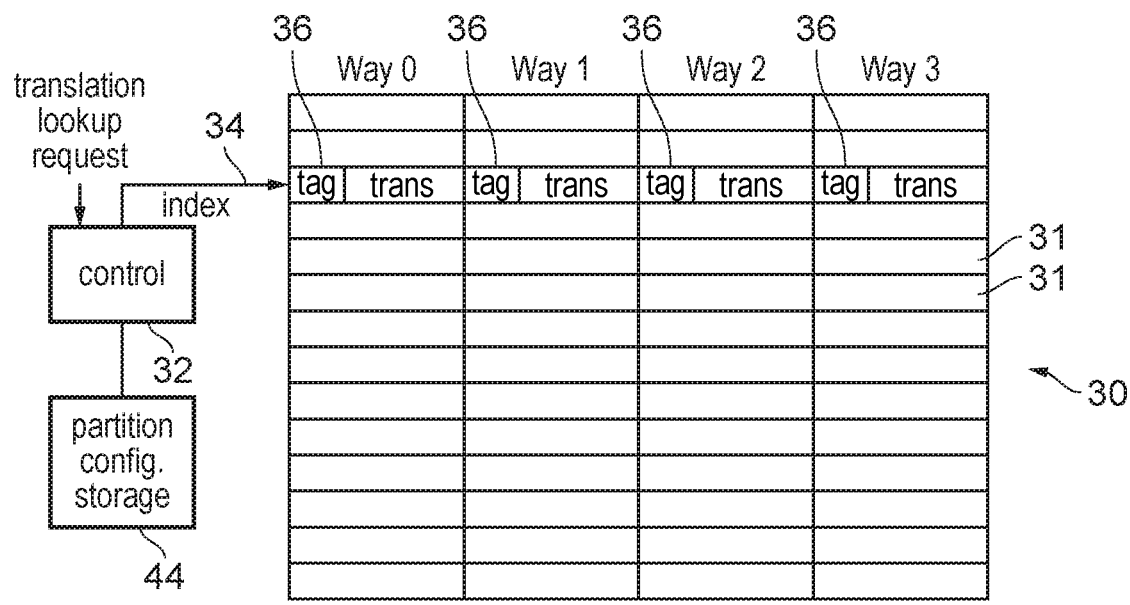
FIG. 4 shows an example of entries of an address translation cache.

FIG. 4 shows an example of an address translation cache 30 within the MMU 12 or SMMU 16. The address translation cache 30 includes a number of storage entries 31 which can each be allocated for storing address translation data for a given block of addresses. The cache 30 may have a set-associative allocation structure, for example, 4-way set-associative in this example. Control circuitry 32 is provided for controlling access to the address translation cache 30 based on a target address provided with a translation lookup request. Part of the address is used to generate an index 34 which selects a given set of entries 31 of the cache 30, and a tag portion of the address is compared with tag values 36 stored in each way of the accessed set to determine whether there is a hit for translation data in the cache for the required target address. When a hit is identified, the translation data is returned for use in the corresponding address translation. When there is a miss then the (S)MMU 12, 16 can perform a part of the page table walk to memory to locate the required translation data and then allocate it to the cache 30. Each entry 31 may, in addition to the actual address translation data and the tag 36, store other information, such as a process identifier, virtual machine identifier or stream identifier which identifies a translation context associated with the address translation data. The translation context identifier may be used to ensure that the translation lookup request only hits against data associated with the same translation context that issued the request. Other information such as information specifying whether the address translation data is from a stage 1 or a stage 2 address translation could also be stored for example, to prevent accidental hits against the same address in another stage. In address translation caches 30 which cache multiple levels of page table data it may not be necessary to specify explicitly the level of the page table corresponding to a given address translation entry, since the different levels of page table would in any case have different addresses as they are stored in different regions of the memory.

As shown in FIG. 4, the control circuitry 32 controls the generation of the index 34 in dependence on programmable partition configuration data stored in partition configuration storage circuitry 44. For example the partition configuration storage 44 may comprise a set of registers maintained by the MMU 12 or system MMU 16.

Figure 5:
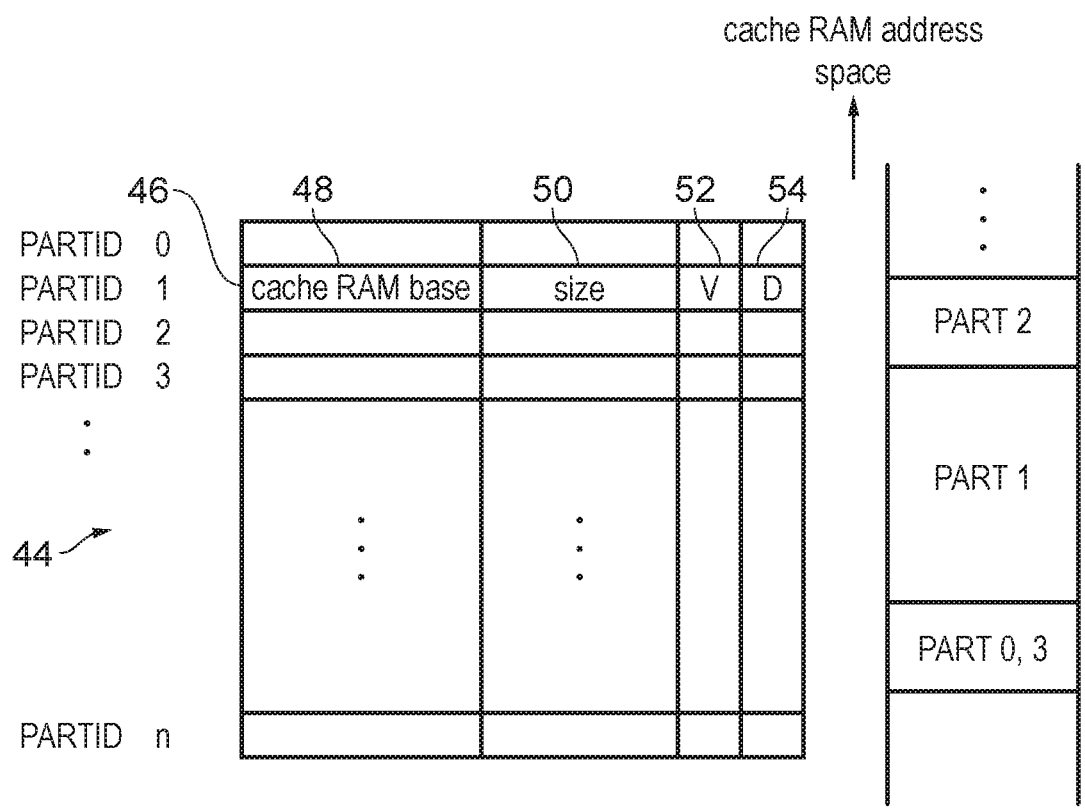
FIG. 5 shows an example of partition configuration storage circuitry for storing programmable partition configuration data.

FIG. 5 shows the partition configuration storage circuitry in more detail. The storage circuitry 44 stores a number of sets 46 of partition configuration data each corresponding to a given partition identifier which is associated with a software execution environment or master device which initiated a translation lookup request. The partition identifiers themselves do not need to be stored in the partition configuration storage circuitry 44 but may instead be used to index into the relevant set of configuration data for the requesting partition identifier. Each set of partition configuration data specifies a subset of the entries 31 of the address translation cache 30 which can be used for allocating address translation data in response to requests issued by a requester having a given partition identifier. In this example the corresponding subset of entries is identified by specifying a cache RAM base address 48 which identifies a start entry of the address translation cache 30 and a size field 50 which identifies the total size of the subset of entries specified for the corresponding partition. It will be appreciated that there are other ways in which the subset could be represented. Note that the cache RAM base address 48 refers to an address within the cache RAM address space used to identify a particular entry of the cache, which is different from the address space shown in FIG. 3 used for accessing memory 14. That is, the cache RAM address space corresponds to the addresses for accessing particular RAM cells of the hardware memory device used to store the address translation cache data. As shown in the right hand part of FIG. 5, by specifying different subsets of entries for different partition IDs, the different partition IDs can be mapped onto different portions of the cache RAM address space. For example, if partition ID 1 requires many entries, this does not affect the ability for partition ID 2 to allocate data into the address translation cache, to limit the performance loss experienced by partition ID 2.

As shown in FIG. 5, each set of partition data may also include a valid flag 52 for indicating whether the subset of entries defined for the partition ID is valid, so it is not necessary for all partition identifiers to be in use at a given time. Also, each set of partition configuration data may also include a duplicate flag 54 which specifies whether the subset of entries specified for one partition identifier is the same as the subset of entries specified for a different partition identifier. For example, when two or more partition identifiers share the same subset of entries, then all but one of the duplicated partition identifiers may have their duplicate flags set to 1 with the remaining partition identifier having the duplicate flag set to 0. This indicates that on invalidations, it is not necessary to step through all of those subsets of entries multiple times in order to invalidate data from the corresponding partition of the cache.

Hence, it is possible for multiple partitions to specify the same subset of entries. In cases as shown in FIG. 5 where each set of partition configuration data refers to a single subset of entries, while the duplicate functionality can still be provided, it may be unnecessary as another way of allowing multiple requesters to map to the same subset of entries could be to simply allocate the same partition identifier to two or more requesters, which can be more efficient as it would leave more partition identifiers free for use by other requesters.

Figure 6:
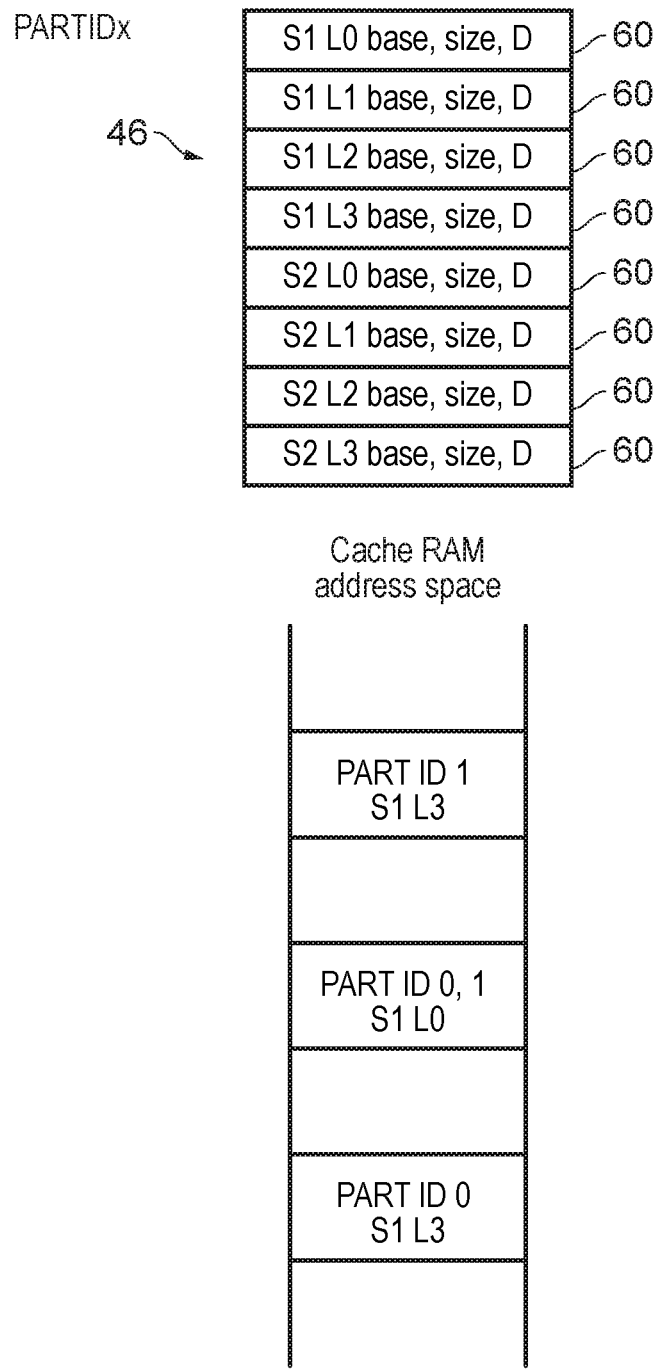
FIG. 6 shows an example of specifying different subsets of entries of the address translation cache for different levels of walk cache and different stages of the address translation process.

However, as shown in FIG. 6, in embodiments which cache address translation data from multiple page table levels and/or multiple stages of address translation in the same address translation cache 30, it can be useful for a given set of partition configuration data 46 for a particular partition identifier to include multiple separate specifications of subsets of entries for the different levels or stages of address translation. For example, in FIG. 6 each set of partition configuration data includes 8 separate segments 60 specifying different subsets of entries of address translation cache, with each segment of the configuration data corresponding to a different combination of the stage 1 or stage 2 address translation and the L0 to L3 page tables. Hence, as shown in the example at the bottom of FIG. 6, this could allow two different partition identifiers to share the same subset of entries for one level of the page tables (e.g. stage 1 level 0) but have different subsets of entries defined for another level (e.g. stage 1 level 3). In this case, supporting sharing of a given walk cache (L0, L1 or L2 page table entry cache) between different partition identifiers which map their walk caches onto the same subset of entries of the address translation cache can be very useful because even if that level of the walk cache needs to be shared between the different partitions, another level may not and so it is not possible to handle the sharing of the walk cache simply by reusing the same partition identifier for different processors.

Hence, in this case each separately specified subset of entries 60 within the same set of partition configuration data 46 may have a separate duplicate flag D set to indicate whether that subset of entries is the same as a subset of entries specified in a different set of partition configuration data for another requester.

Figure 7:
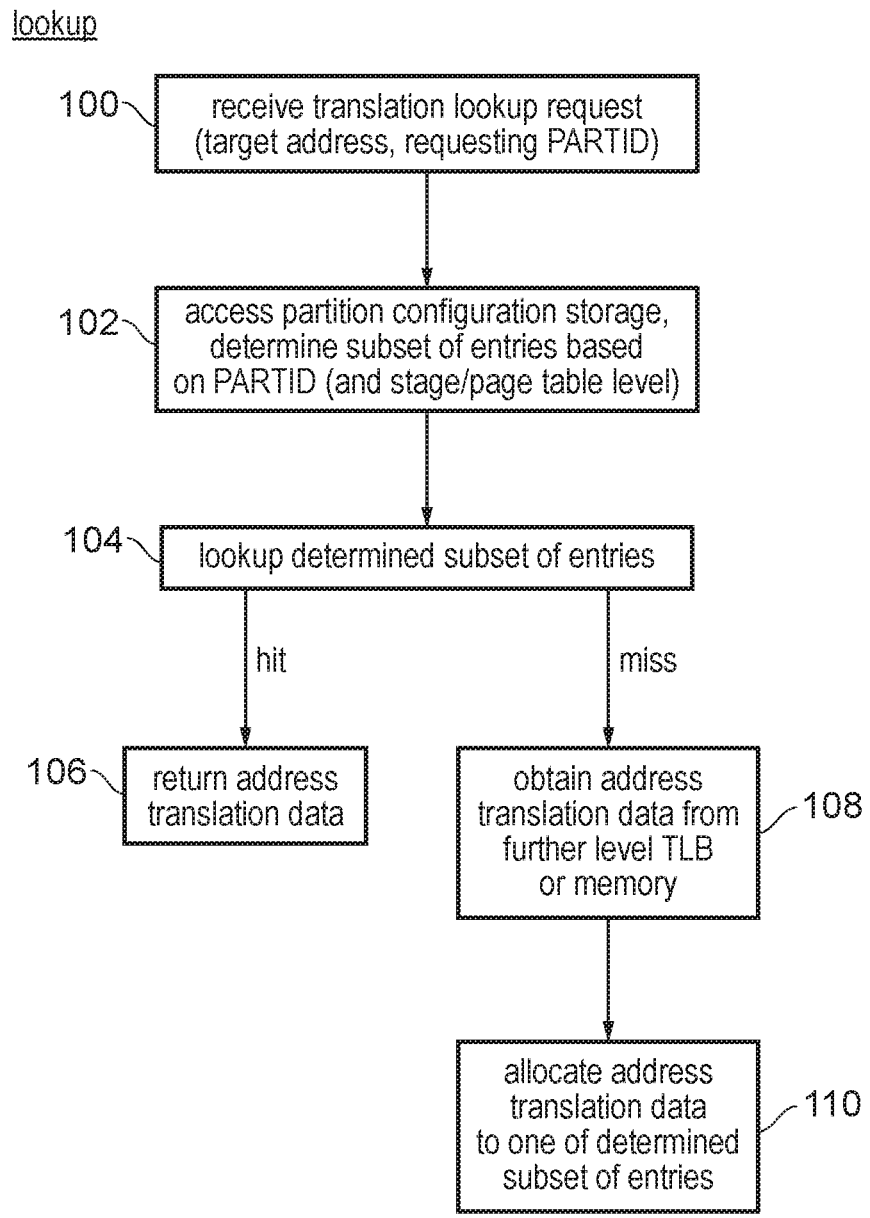
FIG. 7 is a flow diagram showing a method of performing a translation lookup in the address translation cache.

FIG. 7 shows a flow diagram illustrating a method of performing a lookup in the address translation cache 30. At step 100 a translation lookup request is received by the address translation cache 30 specifying at least a target address for which the translation is required and a requesting partition identifier associated with the requester which initiated the translation lookup request. For example the requesting partition identifier can be read from a register within the master which issues the request, for example one of the context registers storing context data for a currently executing software execution environment. Optionally the translation lookup request could also specify other parameters such as the level of the page table targeted by the request, or the stages of address translation corresponding to the request. At step 102 the control circuitry 32 accesses the partition configuration storage circuitry 44 and indexes into the set of configuration data associated with the requesting partition identifier.

The control circuitry 32 determines the subset of entries corresponding to the requesting partition identifier (and if multiple subsets are defined for the same partition identifier, corresponding to the relevant stage of address translation and/or page table level). The control circuitry 32 generates the index 34 for selecting which set of entries to lookup, which is a set of entries within the corresponding subset of entries specified by the partition configuration data 46. For example, if a given implementation normally creates an index large enough to cover the whole cache RAM, then when the subset corresponding to the requesting partition identifier is smaller than that total capacity, the cache RAM may create an index based on a number of least significant bits of the regular index corresponding to the required partition size 50. Although more complex indexing algorithms could also be implemented which do not function in this way, a simple approach with a power of two size where the indexing runs consecutively from the cache RAM base address may often be enough.

At step 104 the control circuitry 32 performs a lookup of the determined subset of entries. In practice the lookup may only access a specific set within that subset in a set-associative cache structure, although a fully associative cache could also be used and in this case the entire subset of entries specified by the corresponding set of configuration data 46 can be used. Control circuitry compares the tag values 36 read from each of the accessed entries with a tag portion of the address and determines whether there is a hit based on whether the tags match. The hit determination may also depend on other comparisons such as comparing context identifiers specified by the lookup request and the entries. If a hit is determined then at step 106 the address translation from the matching entry is returned in response to the translation lookup request. This address translation data could be the final address mapping for the required address or could be an address of a next level page table which can then be the subject of another translation lookup request. If there is a miss then at step 108 the required address translation data can be obtained from a further level address translation cache (TLB) or from main memory 14. At step 110 the obtained address translation data is then allocated to one of the subset of entries which was determined from the partition configuration data 46 for the requesting partition identifier.

Hence, by allocating particular partitions within the address translation cache to particular requesters, this can reduce the chance that one particular requester may monopolise most of the entries of the address translation cache reducing performance for other requesters. This can be particularly useful for data centre or networking applications where there may be a large number of different requesters competing for access to the same hardware and it may be desirable to avoid noticeable performance loss for a given requester.

Figure 8:
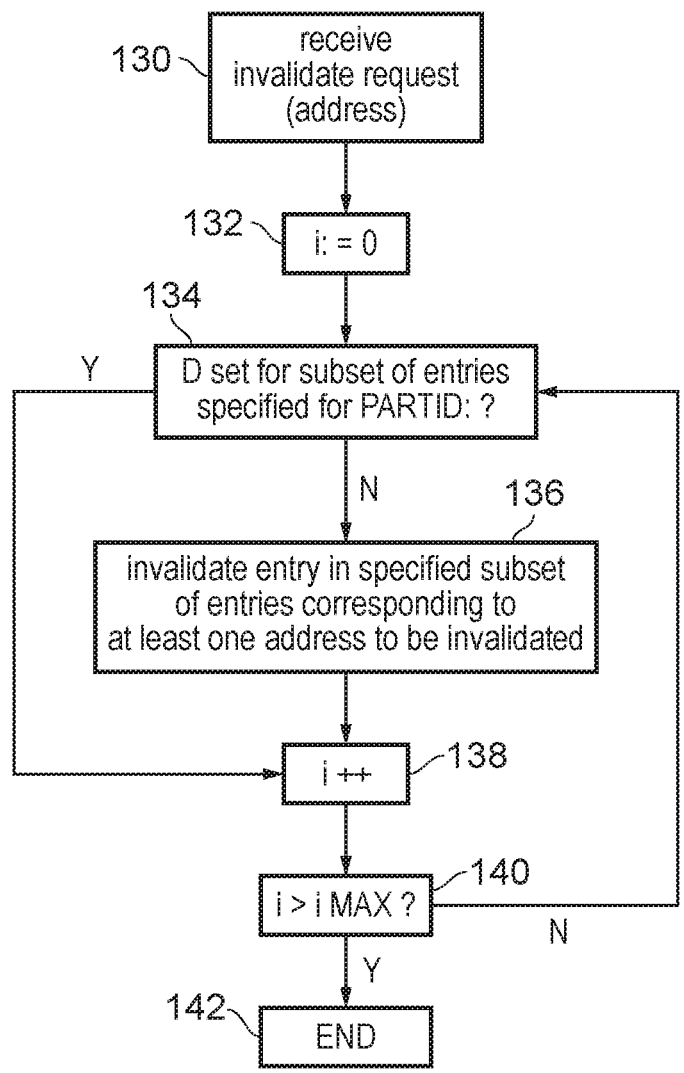
FIG. 8 is a flow diagram showing a method of invalidating address translation data from the address translation cache.

FIG. 8 shows a flow diagram showing a process for invalidating address translation data from an address translation cache 30. At step 130 an invalidate request is received specifying at least one address to be invalidated. Some forms of invalidation requests may be supported which may specify multiple addresses or may specify a range of addresses over which the invalidation is to be performed. At step 132 a partition identifier counter i is initialised at zero. At step 134 the control circuitry 32 determines whether the duplicate flag D is set for a subset of entries specified by partition identifier i, and if not then at step 136 an invalidation lookup is performed within the subset of entries identified by the partition identifier i to trigger invalidations of one or more entries within that subset which correspond to the at least one address to be invalidated. On the other hand, if the duplicate flag was determined to be set for a given subset of entries in partition identifier i, then step 136 is omitted (another iteration through steps 134-136 will invalidate that subset of entries as it is a duplicate). By using the duplicate flag, redundant invalidation lookups to the same subset of entries more than once can be avoided. At step 138 the counter i is incremented and at step 140 it is determined whether i has passed beyond the maximum partition identifier imax. If not then the method returns to step 134 for triggering an invalidation for the next partition identifier, while once the counter i passes beyond the maximum then the method ends at step 142. It will be appreciated that the use of the counter i shown in FIG. 8 is just one approach for controlling stepping through the different sets of partition configuration data.

Hence, invalidations may step through each respective partition to invalidate any translation data associated with the specified one or more addresses to be invalidated. This is because invalidates are normally triggered by updates to the page tables which could affect the translations being used by multiple different requesters. While FIG. 8 shows an example where each set of partition configuration refers to a single subset of entries, it will be appreciated that in embodiment such as FIG. 6 where separate subsets of entries are defined for multiple page table levels or multiple stages of address translation, steps 134 to 138 may in addition cycle through the different subsets of entries within the same set of partition configuration data.

Invalidation of address translation data in the address translation cache 30 may also be performed when a request is made to reconfigure the partition configuration data associated with a given partition identifier. For example, on reconfiguring a given set of partition data, all the entries of the subset currently indicated by that set of partition configuration data can be invalidated, then the partition configuration data updated and then a further invalidation performed to invalidate all the entries in the subset of entries which are now indicated by that set of partition configuration data 36. This prevents one requester learning information about another requester's address access patterns through reconfiguration of the partition configuration data.

In FIG. 5 the relevant set of partition data is selected based on the requesting partition identifier. In some embodiments the selection of the relevant set 46 may also depend on a security flag indicating whether the requesting master is currently operating in a secure domain or a less secure domain, where the secure domain has access to at least some data which is inaccessible in the less secure domain. This can effectively reserve some partition identifier values for software execution environment executed in the secure domain. Alternatively, in some embodiments the maximum cache RAM address which can be specified for partitions associated with less secure processes can be lower than the maximum cache RAM address visible to requesters executed in the secure domain, so that effectively the capacity of the address translation cache which is visible to secure processes is greater than a capacity visible to less secure processes.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
an address translation cache comprising a plurality of entries, each entry to store address translation data for a corresponding block of addresses;
partition configuration storage circuitry to store a plurality of sets of programmable partition configuration data, each set of programmable partition configuration data corresponding to a partition identifier identifying a corresponding software execution environment or master device and specifying a corresponding subset of entries of the address translation cache;
control circuitry responsive to a translation lookup request specifying a target address and a requesting partition identifier identifying the software execution environment or master device associated with the translation lookup request, to perform a lookup operation to identify whether the target address hits or misses in the corresponding subset of entries specified by the set of programmable partition configuration data corresponding to the requesting partition identifier; and
a programmable register indicating the requesting partition identifier to be used for the translation lookup request associated with a given software execution environment or master device;
wherein the partition configuration data defines a variable mapping between a given partition identifier and the corresponding subset of entries in which the control circuitry is allowed to perform the lookup operation in response to a translation lookup request specifying the given partition identifier, wherein the control circuitry is configured to exclude, from the lookup operation performed for the translation lookup request specifying the given partition identifier, entries other than said corresponding subset of entries identified in said variable mapping;
wherein each entry is configured to store address translation data corresponding to one of a plurality of page table levels; and
each set of programmable partition configuration data specifies a corresponding subset of entries separately for at least two of the plurality of page table levels.

2. The apparatus according to claim 1, wherein the control circuitry is configured to allocate address translation data to one of the corresponding subset of entries when the target address misses in the corresponding subset of entries.

3. The apparatus according to claim 1, wherein in response to an invalidation request requesting invalidation of address translation data associated with at least one address, the control circuitry is configured to perform an invalidation lookup operation on subsets of entries specified by at least two of said sets of programmable partition configuration data.

4. The apparatus according to claim 1, wherein in response to a configuration request requesting reprogramming of a given set of programmable partition configuration data, the control circuitry is configured to trigger invalidation of the corresponding subset of entries specified by the given set of programmable partition configuration data.

5. The apparatus according to claim 1, wherein each subset of entries has a size corresponding to a power of 2.

6. The apparatus according to claim 1, wherein each set of programmable partition configuration data specifies information indicative of a start entry and an end entry of the corresponding subset of entries.

7. The apparatus according to claim 1, wherein the partition configuration storage circuitry is configured to support sets of programmable partition configuration data specifying the same subset of entries for two or more different partition identifiers.

8. The apparatus according to claim 7, wherein each set of programmable partition configuration data comprises at least one duplicate flag to indicate whether a subset of entries specified by that set of programmable partition configuration data is the same as a subset of entries specified by another set of programmable partition configuration data.

9. The apparatus according to claim 8, wherein in response to an invalidation request requesting invalidation of address translation data associated with at least one address, the control circuitry is configured to omit performing an invalidation lookup operation on a subset of entries specified by one set of programmable partition configuration data for which the at least one duplicate flag indicates that the subset of entries is the same as the subset of entries specified by another set of programmable partition configuration data.

10. The apparatus according to claim 1, wherein the translation lookup request identifies a specified page table level associated with the request, and in response to the translation lookup request, the control circuitry is configured to perform the lookup operation for the corresponding subset of entries specified for the specified page table level by the set of programmable partition configuration data corresponding to the requesting partition identifier.

11. The apparatus according to claim 1, wherein each entry is configured to store one of stage one address translation data for translating first addresses into second addresses and stage two address translation data for translating second addresses into third addresses.

12. The apparatus according to claim 11, wherein each set of programmable partition configuration data specifies a corresponding subset of entries separately for the stage one address translation data and the stage two address translation data.

13. The apparatus according to claim 1, comprising processing circuitry configured to operate in one of a first domain and a second domain, wherein in the first domain the processing circuitry has access to at least some data which is inaccessible in the second domain.

14. The apparatus according to claim 13, wherein at least one partition identifier is reserved for a software execution environment executed by the processing circuitry in the first domain.

15. The apparatus according to claim 13, wherein a capacity of the address translation cache visible to a software execution environment executed by the processing circuitry in the first domain is greater than a capacity of the address translation cache visible to a software execution environment executed by the processing circuitry in the second domain.

16. An apparatus according to claim 1,
wherein the partition configuration data comprises a programmable table with a plurality of partition data entries, each of the plurality of partition data entries corresponding to a given partition identifier and specifying at least start and end information of the corresponding subset of entries for the given partition identifier.

17. A method for accessing address translation data from an address translation cache comprising a plurality of entries, each entry to store address translation data for a corresponding block of addresses, the method comprising:
    in response to a translation lookup request specifying a target address and a requesting partition identifier identifying a software execution environment or master device associated with the translation lookup request:
    accessing partition configuration storage circuitry storing a plurality of sets of programmable partition configuration data, each set of programmable partition configuration data corresponding to a partition identifier identifying a corresponding software execution environment or master device and specifying a corresponding subset of entries of the address translation cache,
    performing a lookup operation to identify whether the target address hits or misses in the corresponding subset of entries specified by the set of programmable partition configuration data corresponding to the requesting partition identifier;
    wherein the requesting partition identifier is obtained from a programmable register indicating the requesting partition identifier for the translation lookup request associated with a given software execution environment or master device;
    wherein the partition configuration data defines a variable mapping between a given partition identifier and the corresponding subset of entries in which the lookup operation is performed in response to a translation lookup request specifying the given partition identifier, and
    wherein entries other than said corresponding subset of entries identified in said variable mapping are excluded from the lookup operation performed for the translation lookup request specifying the given partition identifier; and
    wherein each entry is configured to store address translation data corresponding to one of a plurality of page table levels; and
    each set of programmable partition configuration data specifies a corresponding subset of entries separately for at least two of the plurality of page table levels.

* * * * *